(12) United States Patent
Suemitsu

(10) Patent No.: US 10,461,949 B2
(45) Date of Patent: Oct. 29, 2019

(54) COMMUNICATION SYSTEM, COMMUNICATION DEVICE, AND MANAGEMENT METHOD FOR COMMUNICATION SYSTEM

(71) Applicant: Yamaha Corporation, Hamamatsu-shi, Shizuoka (JP)

(72) Inventor: Yuki Suemitsu, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 43 days.

(21) Appl. No.: 15/691,113

(22) Filed: Aug. 30, 2017

(65) Prior Publication Data

US 2017/0366365 A1 Dec. 21, 2017

Related U.S. Application Data

(63) Continuation of application No. PCT/JP2016/074182, filed on Aug. 19, 2016.

(30) Foreign Application Priority Data

Aug. 19, 2015 (JP) .................................. 2015-162324

(51) Int. Cl.
*H04L 12/28* (2006.01)
*H04L 12/18* (2006.01)
(Continued)

(52) U.S. Cl.
CPC ............ *H04L 12/189* (2013.01); *H04L 51/30* (2013.01); *H04W 48/12* (2013.01); *H04W 76/10* (2018.02);
(Continued)

(58) Field of Classification Search
CPC ....... H04L 12/18; H04L 12/189; H04L 12/44; H04L 45/02; H04L 45/48; H04W 40/24;
(Continued)

(56) References Cited

U.S. PATENT DOCUMENTS 6,046,992 A * 4/2000 Meier .................... G06F 1/1626
370/338
7,187,925 B2 * 3/2007 Abhishek .............. H04W 48/16
455/426.1

(Continued)

FOREIGN PATENT DOCUMENTS

JP 2001-359200 A 12/2001
JP 2003-101546 A 4/2003
(Continued)

OTHER PUBLICATIONS

WMB20130110, Wireless smart audio module, LinkPlay Wireless Smart Audio Module (A28) User Manual Rev 0.1, 22 pages, Mar. 21, 2014.*

(Continued)

*Primary Examiner* — Frank Duong
(74) *Attorney, Agent, or Firm* — Crowell & Moring LLP

(57) ABSTRACT

A communication system includes communication devices configured to be connected to one another through a network. A root device which is one of the communication devices stores system information including address information and information on availability of communication of the communication devices. The root device is configured to transmit the system information periodically. Each of the communication devices is configured to send an acknowledgement message to the root device when receiving the system information. When an acknowledgement message from one of the communication devices has not been received by the root device, the root device is configured to rewrite the information on availability of communication of the communication device from which the acknowledgement message has not been received by the root device, as incommunicable, and to update the system information accordingly.

15 Claims, 11 Drawing Sheets

(51) Int. Cl.
*H04W 76/10* (2018.01)
*H04W 84/12* (2009.01)
*H04W 92/18* (2009.01)
*H04W 76/19* (2018.01)
*H04W 76/15* (2018.01)
*H04W 48/12* (2009.01)
*H04L 12/58* (2006.01)
*H04W 84/18* (2009.01)
*H04W 40/24* (2009.01)

(52) U.S. Cl.
CPC .......... *H04W 76/15* (2018.02); *H04W 76/19* (2018.02); *H04W 84/12* (2013.01); *H04W 92/18* (2013.01); *H04R 2227/003* (2013.01); *H04R 2227/005* (2013.01); *H04R 2420/07* (2013.01); *H04W 40/24* (2013.01); *H04W 84/18* (2013.01)

(58) Field of Classification Search
CPC ... H04W 48/12; H04W 76/025; H04W 76/02; H04W 76/028; H04W 76/10; H04W 76/15; H04W 76/19; H04W 84/12; H04W 84/18; H04W 92/18; H04R 2227/003; H04R 2227/005; H04R 2420/07
See application file for complete search history.

(56) References Cited

U.S. PATENT DOCUMENTS

| 7,606,175 | B1 | 10/2009 | Maufer | |
|---|---|---|---|---|
| 9,179,197 | B2 * | 11/2015 | Beckhardt | ........ H04N 21/42684 |
| 9,306,764 | B2 * | 4/2016 | Gossain | .............. H04L 12/2838 |
| 2006/0098607 | A1 | 5/2006 | Zeng et al. | |
| 2009/0046614 | A1 | 2/2009 | Lewis et al. | |
| 2010/0115262 | A1 * | 5/2010 | Suyama | .................. H04L 63/06 713/150 |
| 2014/0029603 | A1 | 1/2014 | Nomura et al. | |

FOREIGN PATENT DOCUMENTS

| JP | 2005-252857 A | 9/2005 |
|---|---|---|
| JP | 2006-19994 A | 1/2006 |
| JP | 2009-296262 A | 12/2009 |
| JP | 2011-61569 A | 3/2011 |
| WO | WO 2012/133353 A1 | 10/2012 |

OTHER PUBLICATIONS

English translation of document C2 (Japanese-language Written Opinion (PCT/ISA/237)) previously filed Aug. 30, 2017 issued in PCT Application No. PCT/JP2016/074182 dated Nov. 15, 2016 (six (6) pages).
International Search Report (PCT/ISA/210) issued in PCT Application No. PCT/JP2016/074182 dated Nov. 15, 2016 with English translation (five pages).
Japanese-language Written Opinion (PCT/ISA/237) issued in PCT Application No. PCT/JP2016/074182 dated Nov. 15, 2016 (four pages).
Extended European Search Report issued in counterpart European Application No. 16837167.2 dated Nov. 28, 2018 (11 pages).
Japanese-language Office Action issued in counterpart Japanese Application No. 2015-162324 dated Aug. 27, 2019 with Unverified English translation (five (5) pages).
European Search Report issued in counterpart European Patent Application No. 16 837 167.2 dated Aug. 23, 2019 (nine (9) pages).

* cited by examiner

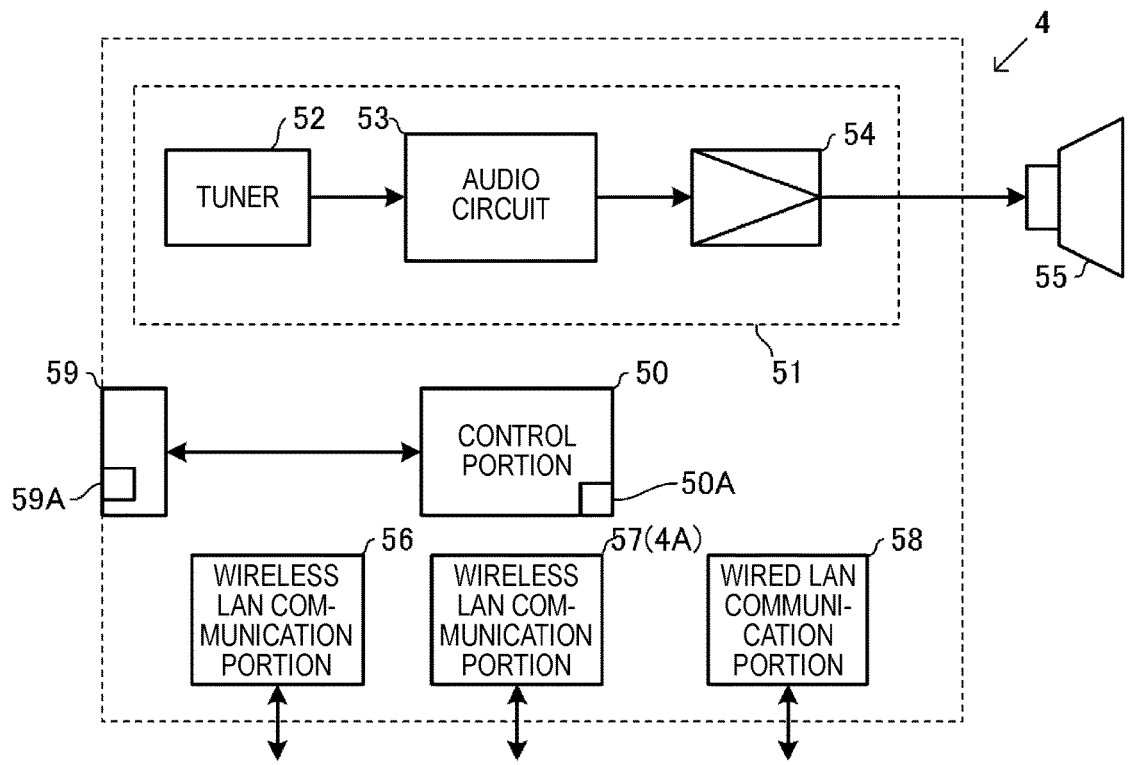

FIG. 5

AUDIO CONTROL TABLE

| | DEVICE ID | IP ADDRESS | DEVICE TYPE | INSTALLATION PLACE | VARIOUS SETTING INFORMATION | ACTIVE |
|---|---|---|---|---|---|---|
| SYSTEM ID = 01 | 00 | 192.168.0.1 | AV RECEIVER | LIVING | ------ | 1 |
| | 01 | 192.168.0.2 | PLAYER | LIVING | ------ | 1 |
| | 02 | 192.168.0.3 | SPEAKER | DINING | ------ | 1 |
| | 03 | 192.168.0.4 | SPEAKER | BED ROOM | ------ | 1 |

COMMUNICATION SYSTEM, COMMUNICATION DEVICE, AND MANAGEMENT METHOD FOR COMMUNICATION SYSTEM

CROSS REFERENCE TO RELATED APPLICATIONS

This application is a continuation of PCT application No. PCT/JP2016/074182, which was filed on Aug. 19, 2016 based on Japanese Patent Application (Patent Application No. 2015-162324) filed on Aug. 19, 2015, the contents of which are incorporated herein by reference.

BACKGROUND OF THE INVENTION

1. Field of the Invention

The disclosure relates to an audio system (communication system) in which audio devices (communication devices) are connected to one another through a network.

2. Description of the Related Art

In an audio system including audio devices, the audio devices are heretofore connected to one another by analog or digital audio cables. Recently, it is considered that the devices are connected to one another through a network (particularly a wireless network) and audio signals or command messages are transmitted/received among the devices by packets in order to eliminate such a troublesome cable group and increase the degree of freedom for connection forms.

An audio cable is required for any input/output. When the audio cable is physically connected to a terminal of a device, connection is completed. On the other hand, for example, as described in JP-A-2003-101546, a wireless network requires setting of an SSID, a password, etc. and setting work is more complicated than connection of the cable. In addition, it is desirable that a connection form of each device in the network is managed but it is troublesome for a user to perform the management.

SUMMARY OF THE INVENTION

Therefore, an object of the disclosure of the invention is to make it easy to manage connection statuses of communication devices on a network in a communication system in which the communication devices are connected to one another using the network.

(1) The communication system according to the disclosure is a communication system including:
communication devices configured to be connected to one another through a network,
wherein a root device which is one of the communication devices stores system information including address information and information on availability of communication of each of the communication devices;
wherein the root device is configured to transmit the system information to each of the communication devices periodically;
wherein each of the communication devices is configured to send an acknowledgement message to the root device when receiving the system information; and
wherein the root device is configured to determine whether the acknowledgement message has been sent from each of the communication devices or not, and, when an acknowledgement message from one of the communication devices has not been received by the root device, the root device is configured to rewrite the information on availability of communication of the communication device from which the acknowledgement message has not been received by the root device, as incommunicable, and to update the system information accordingly.

(2) The communication device according to the disclosure is a communication device including:
a communication portion configured to communicate with another communication device;
a storage portion that stores system information including address information and information on availability of communication of the other communication device; and
a control portion,
wherein the control portion, by using the communication portion, is configured to:
transmit the system information to the other communication device periodically; and
determine whether an acknowledgement message in response to the transmission of the system information has been received from the other communication device or not, and, when the acknowledgement message has not been received from the other communication device, rewrite the information on availability of communication of the other communication device as incommunicable, and update the system information accordingly.

(3) The management method for the communication system according to the disclosure is a management method for a communication system having communication devices which are connected to one another through a network, the management method including:
transmitting system information including address information and information on availability of communication of the communication devices to each of the communication devices periodically from a root device which is one of the communication devices;
sending from each of the communication devices an acknowledgement message to the root device when receiving the system information; and
determining whether the acknowledgement message has been sent from each of the communication devices or not in the root device, and, when an acknowledgement message from one of the communication devices has not been received by the root device, rewriting the information on availability of communication of the communication device from which the acknowledgement message has not been received by the root device, as incommunicable, and updating the system information accordingly in the root device.

According to the disclosure, it is possible to distribute system information to each of connected communication devices, and it is therefore possible to check whether each of the communication devices is connected normally or not, based on a response to the distribution.

BRIEF DESCRIPTION OF THE DRAWINGS

FIG. 3 is a block diagram of an audio device to which the disclosure is applied.

FIG. 4 is a view showing an example of a system management table which is set in a host device and the controller.

FIG. 5 is a view showing an example of an audio control table which is set in the controller.

DETAILED DESCRIPTION OF THE EXEMPLARY EMBODIMENTS

Figure 1:
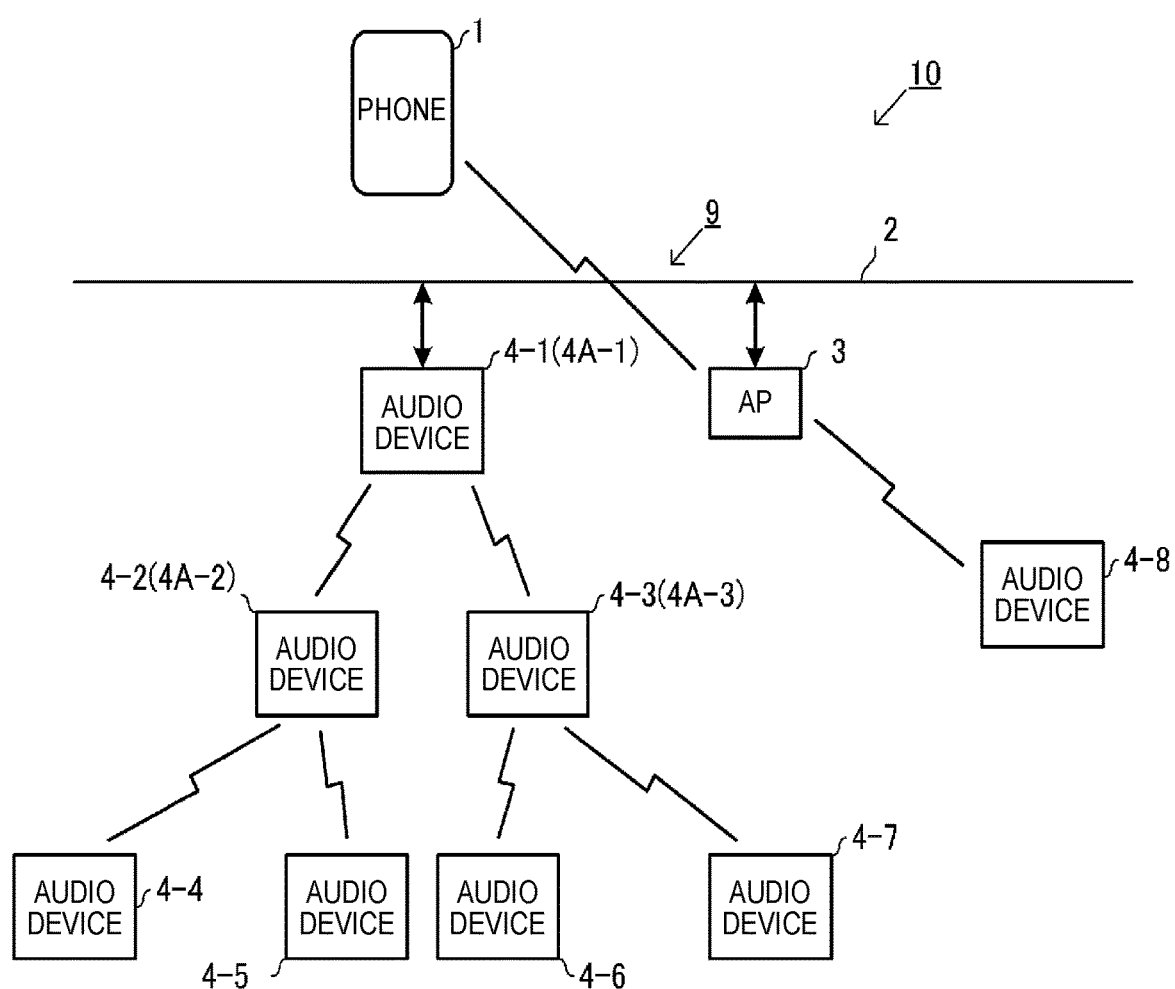
FIG. 1 is a view of the configuration of an audio system to which the disclosure is applied.

FIG. 1 is a view showing the configuration of an audio system to which the present disclosure is applied. The audio system 10 has audio devices 4 (4-1 to 4-8) and a multifunctional portable phone 1 (hereinafter referred to as portable phone). The audio devices 4 (4-1 to 4-8) are connected to one another through a network 9 including a wired LAN 2 and an access point (external access point) 3. The portable phone 1 functions as a controller 1. The audio devices 4 transmit/receive audio signals to/from one another through the network 9. The controller 1 transmits command messages to the audio devices 4 through the network 9.

Each of the audio devices 4 (hereinafter also referred to as component devices) constituting the audio system 10 has one wired LAN function and two wireless LAN functions. The audio device 4 can use one of the two wireless LAN functions to activate its access point. The access point which has been activated by the audio device 4 is called internal access point 4A. Each lower audio device 4 is connected to the internal access point 4A. The internal access point 4A operates in a stealth mode normally (except at the time of initial connection which will be described later) so that presence of the internal access point 4A can be prevented from being known by any other device easily. The other wireless LAN function functions as a wireless LAN adapter so as to be connected to an internal access point 4A of an upper audio device 4 or the external access point 3.

The access point (external access point) 3 is connected to the wired LAN 2. The audio device 4-1 is connected to the wired LAN 2 by a cable. The audio devices 4-2 and 4-3 are connected to an internal access point 4A-1 of the upper audio device 4-1 by a wireless LAN. The audio devices 4-4 and 4-5 are connected to an internal access point 4A-2 of the upper audio device 4-2 by the wireless LAN. In addition, the audio devices 4-6 and 4-7 are connected to an internal access point 4A-3 of the upper audio device 4-3 by the wireless LAN. The audio device 4-8 is connected to the external access point 3.

In the embodiment, the network 9 is constituted by the wired LAN 2, and the wireless LAN which includes the external access point 3 and the internal access points 4A. For example, Ethernet (registered trademark: IEEE 802.3) is used for the wired LAN 2. For example, Wi-Fi (IEEE 802.11g) is used for the wireless LAN.

Each of the audio devices 4 is called one of a root device, a node device, a leaf device and a branch device in accordance with its connection form to the wired LAN 2. The root device is an uppermost device connected directly to the wired LAN 2 (by a cable). In FIG. 1, the audio device 4-1 is such a root device. The root device is an audio device which is initially registered when the audio system 10 is constructed. The root device is a starting point of the audio system 10. The root device activates its internal access point 4A through which lower audio devices 4 can be connected to the network so as to join the audio system 10. Any music information to be reproduced by the audio devices 4 (node devices, leaf devices) connected under the root device is transmitted via the root device.

The node device is an intermediate device which is connected to the root device (the external access point 4A of the root device) by the wireless LAN. In FIG. 1, each of the audio devices 4-2 and 4-3 is such a node device. The node device activates its internal access point 4A through which lower audio devices 4 are connected to the network so as to join the audio system 10. Any music information to be reproduced by the audio devices 4 (leaf devices) connected under the node device is transmitted via the node device.

The leaf device is a lower device connected to the node device (the internal access point 4A of the node device) by the wireless LAN. In FIG. 1, each of the audio devices 4-4, 4-5, 4-6 and 4-7 is such a leaf device. Incidentally, the leaf device does not activate its internal access point 4A. However, the leaf device may be arranged to activate its internal access point 4A alternatively.

Apart from a tree headed by the root device, the branch device is an audio device 4 which is connected to the external access point 3 by the wireless LAN to communicate with other audio devices 4 inside the audio system 10 via the wired LAN 2. In FIG. 1, the audio device 4-8 is such a branch device. Incidentally, the branch device does not activate its internal access point 4A. However, the branch device may be arranged to activate its internal access point 4A alternatively.

In the audio system, at most two node devices are allowed to be connected to the root device in order to transmit an audio signal with high quality. In addition, at most two leaf devices are allowed to be connected to each node device. In addition, the number of hierarchical tires in connection using the internal access points 4A is limited to three, including a tire of the root device, a tire of the node devices, and a tire of the leaf devices. Accordingly, at most seven audio devices including the root device can be connected based on the tree of the wireless LAN headed by the root device. A largest connectable number (seven) of the audio devices 4 (4-1 to 4-7) are connected to one another in the tree shown in FIG. 1. The number of the branch devices is not limited. However, the number of the audio devices 4 to be controlled by the controller 1 in the audio system 10 as a whole is limited to 10. In the invention, however, the largest number of the hierarchical tiers of the tree, the largest number of lower devices which can be connected to each audio device 4, etc. are not limited to those in the embodiment.

When an audio system control program 70 (see FIG. 2) is activated, the portable phone 1 functions as the audio system controller (hereinafter simply referred to as controller) 1. The portable phone 1 (controller 1) communicates with the audio devices 4 belonging to the audio system 10, through the network 9. By the communication, the controller 1 can control audio sources to be reproduced within the audio system 10 (e.g. which music is reproduced by which audio device 4, which music is distributed to which audio device 4, etc.), the volumes of the audio sources, etc. In addition, each of the audio devices 4 communicates with another audio device 4 to which the aforementioned audio device 4 belongs through the network 9, so as to transmit/receive an audio signal to/from the other audio device 4.

Figure 2:
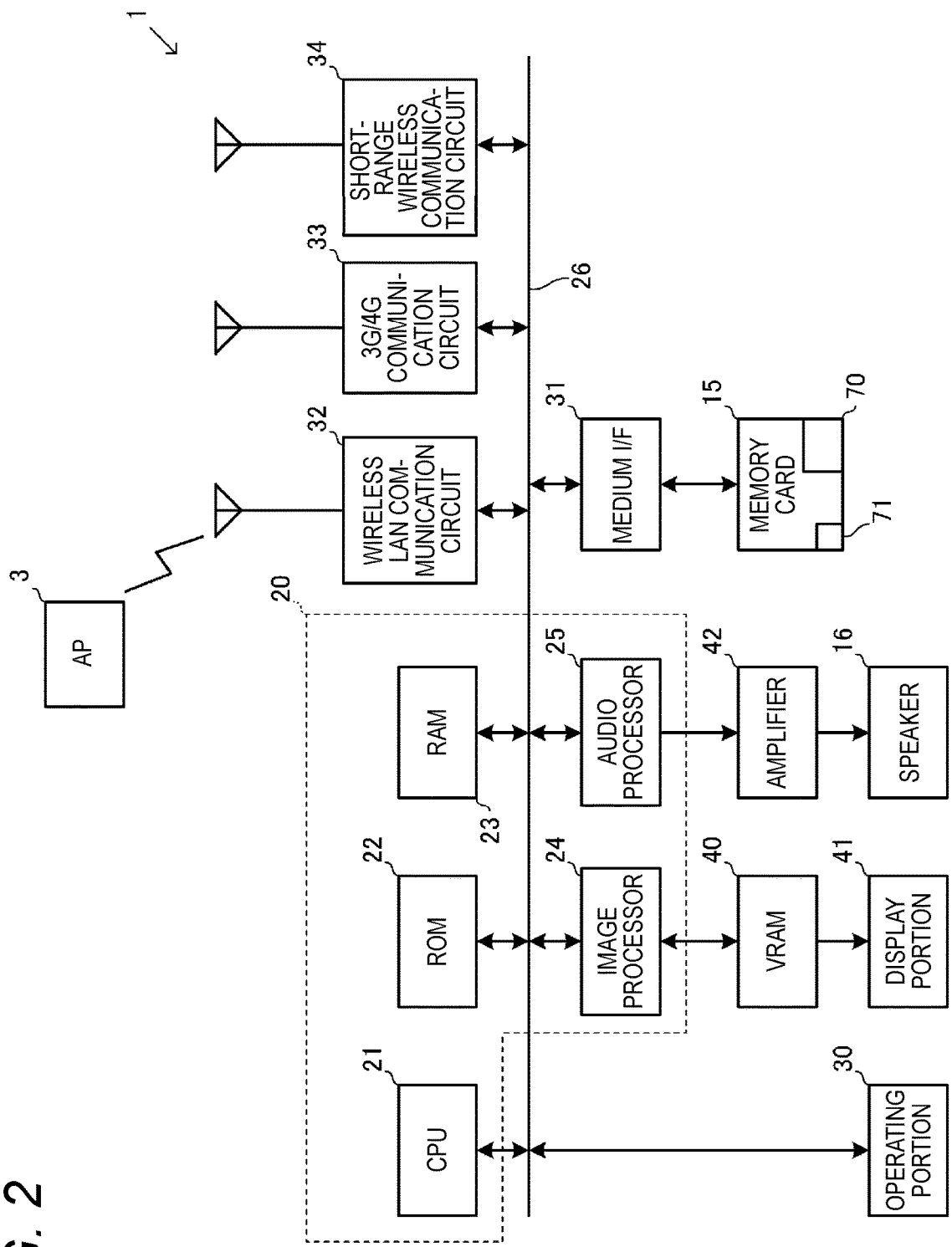
FIG. 2 is a block diagram of a portable phone to which the disclosure is applied and which functions as a controller.

Next, the configuration of the portable phone 1 will be described with reference to a block diagram of FIG. 2. The portable phone 1 is a multifunctional phone so-called smart phone. The portable phone 1 has a 3G/4G communication function which is a portable communication network, a wireless LAN (Wi-Fi) communication function, and a Bluetooth (registered trademark) communication function. When the audio system control program 70 which is an application program is activated, the portable phone 1 functions as the controller 1 which can communicate with each of the audio devices 4 of the audio system via the network 3 to transmit a command message to the audio device 4 in accordance with an operation of a user so as to control the audio system.

The portable phone 1 has a control portion 20, an operating portion 30, a medium interface 31, a wireless LAN communication circuit 32, a 3G/4G communication circuit 33, and a short-range wireless communication circuit 34 on a bus 26. The short-range wireless communication circuit 34 can perform Bluetooth (registered trademark) communication. The control portion 20 includes a CPU 21, an ROM (flash memory) 22, an RAM 23, an image processor 24, and an audio processor 25. A video RAM (VRAM) 40 is connected to the image processor 24. A display portion 41 is connected to the VRAM 40. The display portion 41 includes a liquid crystal display. A standby screen, a phone number, etc. is displayed on the display. In addition, when the portable phone 1 functions as the controller 1, a screen for controlling the audio devices 4 is displayed. An amplifier 42 including a D/A converter is connected to the audio processor 25. A speaker 16 is connected to the amplifier 42.

The image processor 24 is provided with a GPU (Graphics Processing Unit) which generates various graphic images of the standby screen, the phone number etc. When the audio system control program 70 is activated, the image processor 24 generates an image of an audio controller in accordance with an instruction of the CPU 21, and develops the generated image on the VRAM 40. The image developed on the VRAM 40 is displayed on the display portion 41.

The audio processor 25 has a DSP (Digital Signal Processor) which encodes/decodes voice of a call. The audio processor 25 outputs the decoded/generated voice to the amplifier 42. The amplifier 42 amplifies the voice signal and outputs the amplified voice signal to the speaker 16.

The wireless LAN communication circuit 32 performs wireless communication with a router in accordance with the standard of IEEE 802.11g etc. to communicate with the audio devices 4 through the access point 3, 7. The 3G/4G communication circuit 33 makes a voice call and performs data communication through the portable phone communication network. The short-range wireless communication circuit 34 communicates with another Bluetooth (registered trademark) compliant device to, for example, transmit/receive an audio signal etc. to/from the other Bluetooth (registered trademark) compliant device.

The operating portion 30 includes a touch panel formed on the display portion 41 so that the operating portion 30 can detect a touch operation or a flick operation on the touch panel. When the audio system control program 70 is activated, operators such as a setup button, a scan button, etc. are displayed on the display portion 41. The operating portion 30 detects a touch operation of the user and coordinates thereof through the touch panel so as to determine an operator which has been operated.

A memory card 15 is connected to the medium interface 31. The memory card 15 is, for example, a micro SD card. The audio system control program 70 can be stored in the memory card 15 or the ROM 22. In the embodiment, the audio system control program 70 is stored in the memory card 15, as shown in FIG. 2. Incidentally, the audio system control program 70 may be downloaded by 3G/4G or wireless LAN data communication or may be stored in advance in the ROM 22 or the memory card 15. In addition, a storage area 71 for storing the configuration of the audio system is set in the memory card 15.

A basic program for making a call of the portable phone 1 or executing an application program is stored in the ROM 22. In addition, the ROM 22 is a flash memory. In addition to the basic program, any downloaded application program etc. can be also stored in the ROM 22. A work area which can be used when the CPU 20 executes the audio system control program 70 is set in the RAM 23.

Next, the configuration of each of the audio devices 4 will be described with reference to FIG. 3. The audio device 4 has a control portion 50, an audio processing portion 51, and an operating portion 59. In addition, the audio device 4 has two wireless LAN communication portions (RF modules) 56 and 57 and one wired LAN communication portion 58. The operating portion 59 has a connect button 59A as well as a volume operator (not shown). The control portion 50 includes a CPU and a memory, and stores an audio system program. Based on the audio system program, the control portion 50 controls operations of the audio processing portion 51, the wireless LAN communication portions 56 and 57 and the wired LAN communication portion 58. In addition, when the connect button 59A is pressed, the control portion 50 executes an initial connection operation which is an operation for connecting the audio device 4 to the network 9. The initial connection operation will be described later in detail.

The wireless LAN communication portion 56 performs wireless communication with the external access point 3 or an internal access point 4A of an upper audio device 4 based on the wireless LAN standard of IEEE 802.11g etc. In addition, the other wireless LAN communication portion 57 is activated as an access point (internal access point 4A) to relay another audio device (e.g. the audio device 4-2, 4-3 etc.) to the wired LAN 2. In addition, the wireless LAN communication portion 57 is activated as an initial connection temporary access point also at the time of initial connection of the audio device 4 so as to communicate with the controller 1 (portable phone 1). Operation at the time of initial connection will be described later. Incidentally, the two wireless LAN communication portions 56 and 57 may be materialized by one piece of hardware which is operated in a time division manner. The wired LAN communication portion 58 has a cable connector through which the wired LAN communication portion 58 can make communication via the wired LAN 2 and the access point 3 based on the communication standard of IEEE 802.3 etc. The controller (portable phone) 1 is connected to the access point 3. The control portion 50 communicates with the controller 1 via the network 9 to transmit an operating status to the controller 1 or receive a command message from the controller 1.

An SSID and a password of the internal access point 4A are set as character strings which can be calculated from an MAC address of the wireless LAN communication portion 57. For example, a character string in which the MAC address is expressed by octets is set as the SSID and the last three octets (a device type ID+a serial number) are set as the password. Thus, an audio device newly joining the audio system can find the internal access point 4A based on the SSID, i.e. based on a vendor ID and the device type ID of the MAC address, and generate a password by itself so as to establish connection to the internal access point 4A. Thus, it is possible for a user to omit input of the SSID and the password when the user establishes connection to the internal access point 4A. Incidentally, a method for generating the SSID and the password of the internal access point 4A is not limited to the aforementioned method.

The audio processing portion 51 has a tuner 52, an audio circuit 53, and a power amplifier 54. The tuner 52 receives an audio signal from FM broadcasting or the Internet, and inputs the received audio signal to the audio circuit 53. The audio circuit 53 performs processing such as equalization, volume adjustment, etc. on the inputted audio signal, and then outputs the processed audio signal to the power amplifier 54. The power amplifier 54 amplifies the inputted audio signal and outputs the amplified audio signal to an externally connected speaker 55. The speaker 55 releases the inputted audio signal as sound.

Incidentally, the audio devices 4-1 to 4-8 may be devices which are different from one another. However, the basic configurations of the communication function and the audio signal processing function are shown in FIG. 3.

FIG. 4 and FIG. 5 are views showing examples of tables for managing the audio system. FIG. 4 is a system management table for managing connection forms of the audio devices 4 in the network 9. FIG. 5 is an audio control table for managing operations of the audio devices 4 in the audio system 10. The system management table is mainly used for management of network connection by the root device 4-1. In addition, the audio control table is mainly used for reproduction control of audio sources by the controller 1.

The connection forms of the respective audio devices 4 (component devices) constituting the audio system 10 are stored in the system management table. The system management table is generated by the controller 1 when the audio system 10 is constructed. In addition, when a new audio device 4 is added to the audio system 10, the controller 1 performs updating for adding the audio device 4. The generated or added/updated system management table is transmitted from the controller 1 to the root device 4-1. Then, the system management table is updated by the root device 4-1 whenever disconnection or reconnection of any component device occurs during operation of the audio system 10. In addition, the root device 4-1 periodically transmits the whole or a portion of the contents of the system management table as system information to the respective component devices and the controller 1. Thus, each of the component devices and the controller 1 can always keep the latest system information. Operation for transmitting the aforementioned system information will be described later in detail.

The system management table is identified by a system ID for identifying the audio system 10. Each of the component devices stores information such as upper-side (adapter-side)/lower-side (internal access point-side) MAC addresses (i.e. MAC addresses of the wireless LAN communication portions 56/57), upper-side/lower-side IP addresses (i.e. IP addresses of the wireless LAN communication portions 56/57), a connection tier number (HOP number) from the root device 4-1, activation/non-activation of an internal access point 4A, the number of lower devices (the number of children) connected to the internal access point 4A, and operating status (communicable/incommunicable) information (active), in association with a device ID of the device. When any one of the component devices is disconnected from the root device 4-1 (communication is disrupted), the field of that device is rewritten as inactive (incommunicable). When the device is reconnected, the field of the device is updated with contents in which the device is reconnected, and the device is then activated again. The aforementioned operations about disconnection and reconnection will be described later in detail.

Incidentally, although each of the component devices has the individual IP addresses, a multicast address is set as a multicast group in the audio system 10. When an IP packet of the aforementioned system information is transmitted to the multicast address, the packet of the system information can be received by all the component devices of the audio system 10. Incidentally, the packet of the system information may be transmitted to the IP addresses of the respective component devices by unicasting. However, when the packet of the system information is transmitted by multicasting, the load of the network 9 can be reduced.

In the audio control table in FIG. 5, the upper-side IP address (the IP address of the wireless LAN communication portion 56), a device type, an installation place and the operating status information of each component device and various setting information such as a volume value, a display name etc. are stored in association with a device ID of the device. Each field of the audio control table and each field of the system management table are associated with each other by the device ID. The controller 1 generates a control screen based on the contents of the audio control table and accepts control of each component device from the user.

The audio system 10 is constructed as follows. That is, the root device 4-1 is set initially, and the audio system 10 is constructed accordingly. Then, another audio device 4 than the root device 4-1 is added to the audio system 10. The user does work in the following procedure. The user connects the audio device 4-1 to the wired LAN 2 by a cable. The audio device 4-1 serves as the root device. The user activates the controller 1 in a setup mode on the portable phone 1. The user presses a connect button 59A of the audio device 4-1. As soon as the user performs the aforementioned work, the controller 1 and the root device 4-1 communicate with each other to construct the audio system 10 automatically. Then, in order to add a new audio device 4 to the audio system 10, the user activates the controller 1 in the setup mode, powers on the audio device 4 to be added (activates the wireless LAN communication portion 56, 57), and presses a connect button 59A thereof. In this manner, the audio device 4 communicates with the controller 1 and the root device 4-1 to thereby generate a password automatically from the aforementioned SSID. As a result, the audio device 4 is added to the audio system 10 automatically.

A procedure for establishing communication between a controller 1 and an audio device 4 when an audio system 10 is constructed and a procedure for establishing communication among the controller 1, the audio device 4 and another audio device 4 when the other audio device 4 is added to the audio system 10 will be described with reference to FIGS. 6 to 9.

Figure 6:
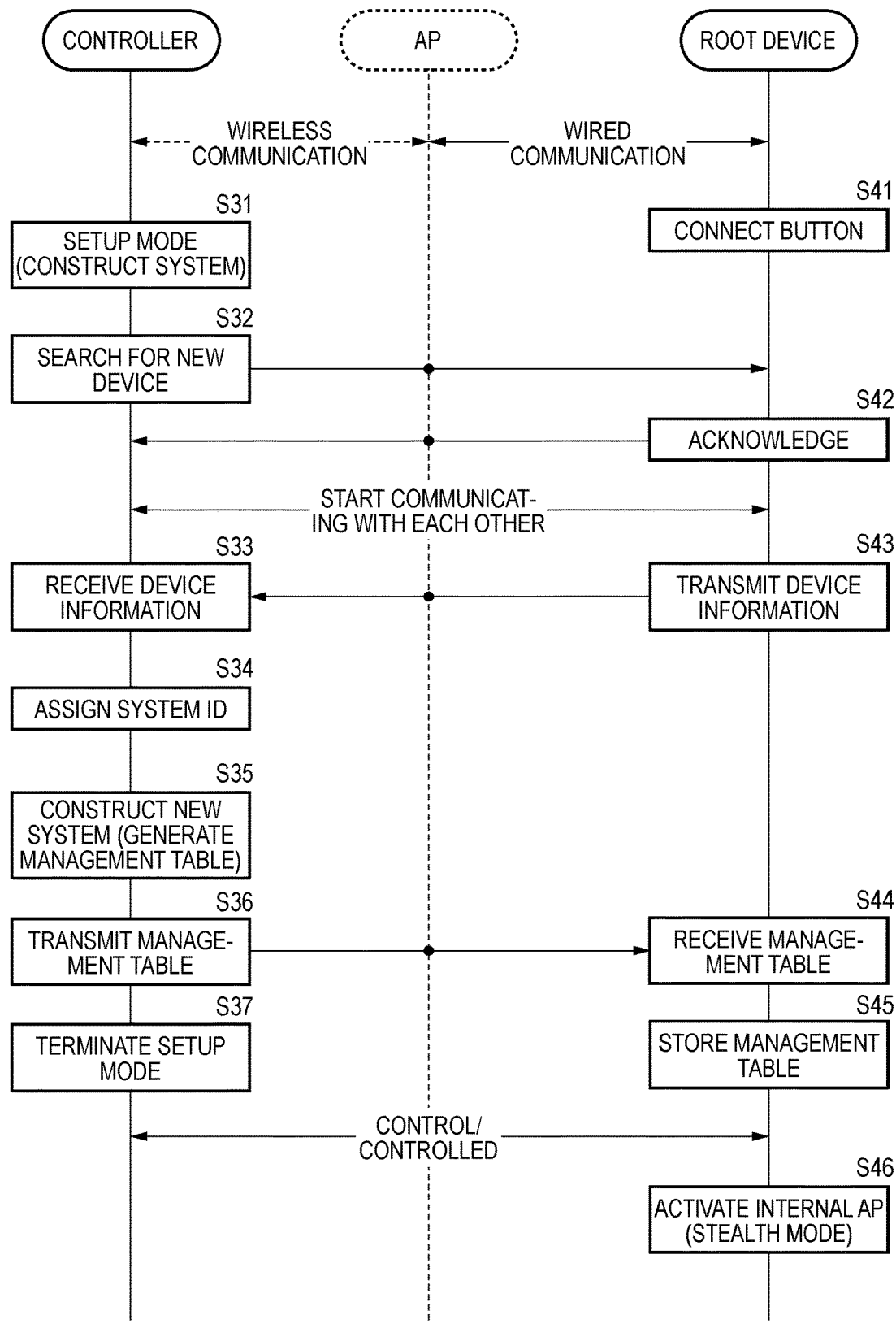
FIG. 6 is a view showing a procedure of establishing communication between the controller and an audio device.

FIG. 6 is a view showing the procedure for establishing communication between the controller 1 and the audio device 4-1 which serves as a root device when the audio system 10 is newly constructed. A portable phone 1 functions as the controller 1 when an audio system control program 70 is activated. When the controller 1 is changed to a setup mode by an operation of a user (S31), a guide screen for prompting the user to press a connect button 59A of the audio device 4 is displayed on a display portion 41. In accordance with the guidance of the screen, the user presses the connect button 59A of the audio device 4-1 (S41). Next, the controller 1 searches for a new audio device connected to the wired LAN 2 (S32). The searching is performed by transmitting a message for requesting a response, for example, by polling. The audio device 4-1 sends an acknowledgement in response to the searching (S42). Thus, the controller 1 and the audio device 4-1 start communication with each other through the wired LAN 2 and the access point 3.

The audio device 4-1 transmits its own device information (MAC addresses, IP addresses, etc. of wireless LAN communication portions) to the controller 1 (S43). The controller 1 constructs the new audio system 10 using the audio device 4-1 as the root device as follows. The controller 1 assigns a system ID to the audio system 10 (S34). Then, the controller 1 generates a system management table and an audio control table shown in FIGS. 4 and 5, and constructs the audio system 10 using the currently communicating audio device 4 as the root device (S35). When the audio system 10 is constructed, the controller 1 transmits the system management table to the audio device 4-1 serving as the root device (S36). Then, the controller 1 terminates the setup mode (S37). The audio device 4-1 receives the system management table (S44) and stores it (S45). Thus, the audio system 10 using the audio device 4-1 as the root device which is a key constituent element (component) is constructed. Hereafter, music to be reproduced, the volume thereof, etc. can be controlled by the controller 1. The audio device 4 activates its access point in the stealth mode (S46).

Figure 7:
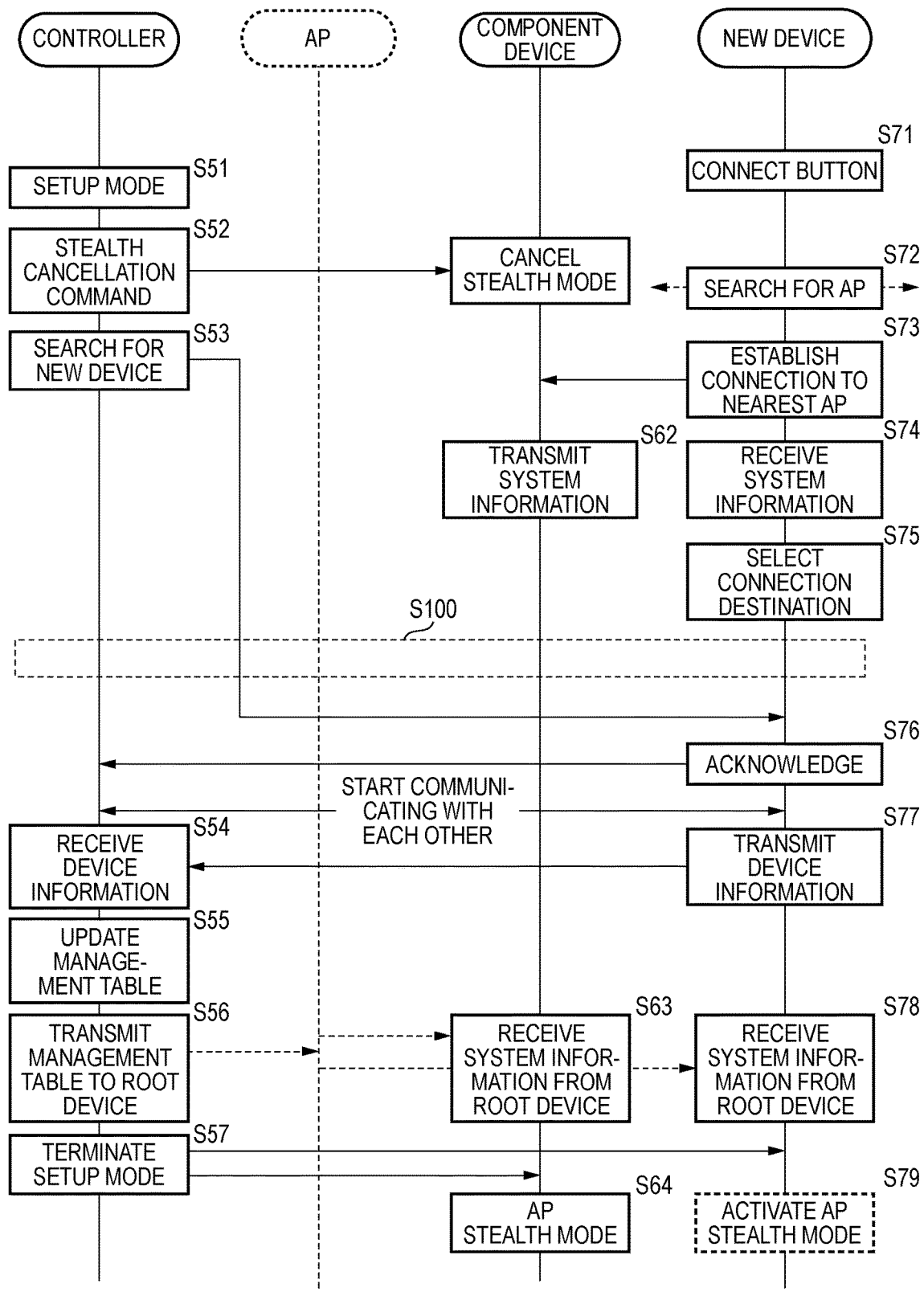
FIG. 7 is a view showing a procedure of establishing communication among the controller, the audio device and another audio device.

FIG. 7 is a view showing a communication procedure when a new audio device is added to an audio system 10 which has been already been constructed. Component devices are audio devices 4 which have already been constituent elements of the audio system 10. Here, each of the component devices is a root device or a node device whose internal access point 4A has been activated. The new device is an audio device 4 which will be newly added from now on.

When the portable phone 1 functioning as the controller 1 is changed to a setup mode by an operation of the user (S51), a guide screen for prompting the user to press a connect button 59A of the audio device 4 (new device) is displayed on the display portion 41. In accordance with the guidance of the screen, the user presses the connect button 59A of the new device (S71). The controller issues an instruction to the component devices to cancel the stealth modes of the internal access points 4A (S52). The component devices are the audio devices 4 which have already been registered. In response to this, the component devices cancel the stealth modes of the internal access points 4A, and transmit beacon frames for informing of their own presences so as to make passive scanning of the new device possible (S61). Next, the controller 1 starts searching for the new device (S53).

When the connect button 59A of the new device is pressed by the user (S71), the new device is changed to an initial connection mode to search for (passively scan) any connectable access points (S72). In the searching, the new device finds internal access points 4A of component devices as the connectable access points. As described above, the internal access points 4A have SSIDs based on which the internal access points 4A can be identified as devices of the audio system 10 as viewed from the new device. In addition, the new device can generate a password from any of the SSIDs (or MAC addresses) of the internal access points 4A so as to establish connection to the corresponding internal access point. The new device selects a nearest one (an easiest one to be connected) from the found internal access points 4A, and establishes temporary connection to the selected internal access point 4A using the SSID and the generated password (S73). The connection is not permanent connection for joining the audio system 10 but temporary connection for acquiring system information. The new device acquires the current system information of the audio system 10 from the connected internal access point 4A (component device) (S62, S74). The system information is information including the contents of the whole or a portion of the system management table. The root device 4-1 updates the system information periodically to distribute the updated system information to the other component devices. The new device selects a most suitable access point for joining the audio system 10 based on the acquired system information (S75). This selection is made based on a radio field intensity of each of the access points, the number of connection tiers from the root device 4-1, the number of component devices connected to the access point, etc. Thus, an access point whose communication conditions appear good can be selected.

Figure 8:
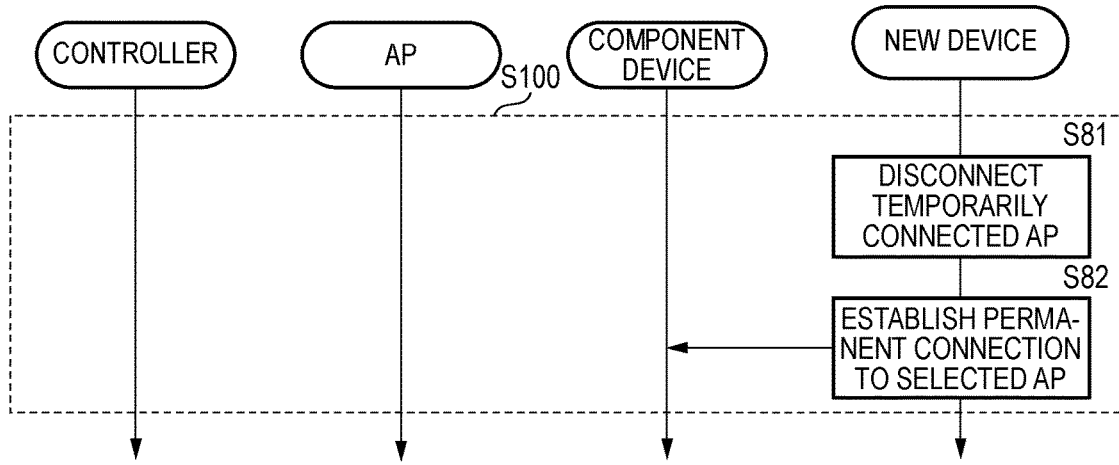
FIG. 8 is a view showing a procedure of establishing communication among the controller, the audio device and the other device.
Figure 9:
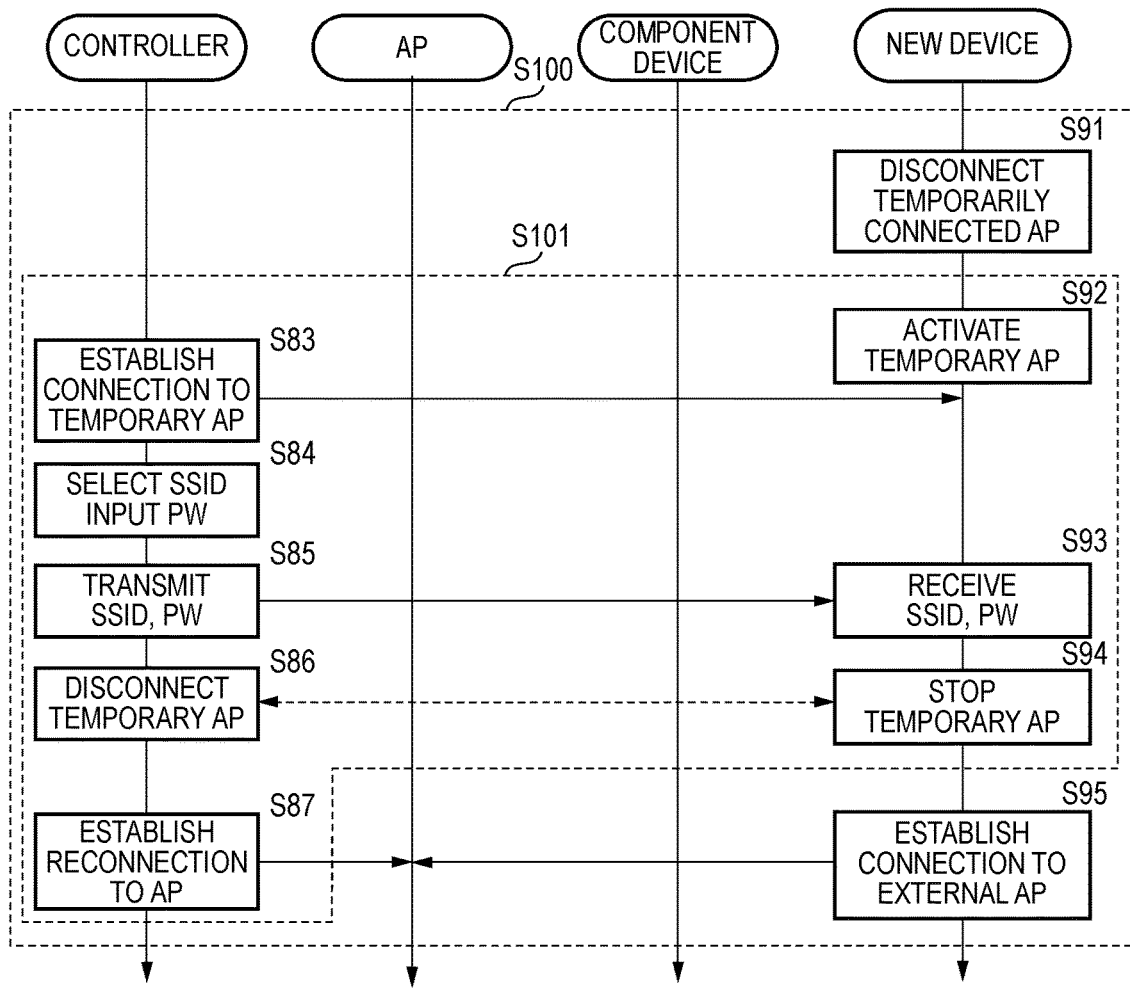
FIG. 9 is a view showing a procedure of establishing communication among the controller, the audio device and the other device.

In a flow shown in the example of FIG. 7 (the example in which S100 is not executed), the temporarily connected internal access point 4A is determined as the most suitable also in the permanent connection and the connection destination is therefore unchanged. For example, the case where the new device is connected to the internal access point 4A-1 of the root device 4-1 corresponds to this. When the connection destination has to be changed from the temporarily connected internal access point 4A in the permanent connection, a procedure of FIG. 8 or FIG. 9 is executed in the section of S100 shown in FIG. 7. When the permanent connection is completed (after the temporary connection has been treated as the permanent connection in the case of FIG. 7), the new device receives a new device searching message from the controller 1 (S53), and sends an acknowledgement in response to the new device searching message (S76). In this manner, the new device can communicate with the controller 1. Thus, music to be reproduced by the new device, the volume of the music, etc. can be controlled by the controller 1. Accordingly, the new device becomes a constituent element (component) of the audio system 10.

The new device transmits its own device information (MAC addresses, IP addresses etc. of wireless LAN communication portions) to the controller 1 (S77). The controller 1 receives the device information (S54), registers the new audio device 4 into the system management table and the audio control table, and updates the system management table and the audio control table (S55). The controller 1 transmits the updated system management table to the root device 4-1 (S56). Then, the controller 1 terminates the setup mode (S57). The root device 4-1 periodically distributes the system information including the contents of the whole or a portion of the system management table, to the other component devices. The system information serves as a connection confirmation message which will be described in FIGS. 10A and 10B. A setup mode termination notification is transmitted from the controller 1 to all the audio devices 4. However, the controller 1 may transmit the setup mode termination notification only to the root device 4-1 and the root device 4-1 may transfer the setup mode termination notification to the other audio devices 4 of the audio system 10.

The new device which has received the system information from the root device 4-1 stores the system information (S78). Then, the new device activates its internal access point 4A in the stealth mode (S79). In addition, the component devices which have received the system information from the root device 4-1 update the internally stored system information with the information (S63). The component devices return their internal access points 4A to the stealth mode (S64). By the aforementioned processing, the new device can be added to the constructed audio system 10. Incidentally, of the component devices and the new device, only the root device and node devices activate their internal access points 4A in the stealth mode. Leaf devices and branch devices do not perform the processing of S64, S79.

FIG. 8 is a view showing a communication procedure when the new device cuts the connection to the temporarily connected internal access point 4A and reconnects itself to another internal access point 4A inside the tree in S75. When the other internal access point 4A is selected as the connection destination of the permanent connection in S75 of FIG. 7, the new device cuts the connection to the current temporarily connected internal access point 4A (S81), and establishes permanent connection to the selected internal access point 4A using address information of the system information (S82). Then, the new device moves to S76 of FIG. 7.

FIG. 9 is a view showing a communication procedure when the new device cuts the connection to the temporarily connected internal access point 4A and reconnects itself as a branch device to the external access point 3 in S75. When the external access point 3 is selected as the connection destination of the permanent connection in S75 of FIG. 7, the new device cuts the connection to the current temporarily connected internal access point 4A (S91), and activates a temporary access point only at the time of initial connection in a stand-alone manner (S92). That is, the internal access point 4A which is not connected to the wired LAN 2 but only connected to the new device is activated. The controller 1 has stored an SSID and a password of the temporary access point for initial connection in advance. That is, the SSID and the password are written as data in advance in the audio system control program 70. Accordingly, the controller 1 finds the temporary access point in the new device searching started in S53, cancels connection to the external access point 3 once, and establishes connection to the temporary access point which is activated by the new device (S83). It is highly likely that the controller 1 cannot acquire the SSID and the password of the external access point 3 from the system program of the portable phone 1. Therefore, the controller 1 requests the user to input the SSID and the password of the external access point 3 here (S84). The SSID may be inputted by the following method. That is, a list of connection destinations (SSIDs) which can be seen at that time is displayed on the display to request the user to select the SSID of the external access point 3 from the list. The user is requested to input the password (normally written on a body of the external access point 3).

The inputted connection information is transmitted to the new device which has activated the temporary access point (S85). The new device receives the connection information (S93). After transmitting the connection information (SSID, password) of the external access point 3 to the new device, the controller 1 cancels the connection to the temporary access point (S86). On receiving the connection information of the external access point 3 from the controller 1, the new device stops the temporary access point (S94). The controller 1 reestablishes connection to the external access point 3 whose connection to the controller 1 has been cancelled once (S87). The new device also establishes connection to the external access point 3 using the acquired connection information (S95). Then, the flow returns to the procedure of FIG. 7. That is, the controller 1 performs the new device searching (S53) and the new device sends an acknowledgement in response to the new device searching (S76). Incidentally, when the connection information of the external access point 3 is included in the system information acquired from the temporarily connected component device, the processing (S83 to S87, S92 to S94) shown in S101 may be omitted so that the new device can reestablish connection to the external access point in the same manner as in FIG. 8.

As described above, the root device 4-1 transmits the system information to the other audio devices (component devices) 4 of the audio system 10 periodically (once every two seconds). The system information includes the (internal access point-side) MAC address, the IP address, the number of connection tiers (HOP number) from the root device 4-1, activation/non-activation of the internal access point, the number of lower devices connected to the internal access point 4A, and the connection information etc. of the external access point 3 in association with each of the component devices. The root device 4-1 transmits the system information as an echo request packet (ping) to each of the component devices. The packet will be hereinafter referred to as system information packet.

Figure 10A:
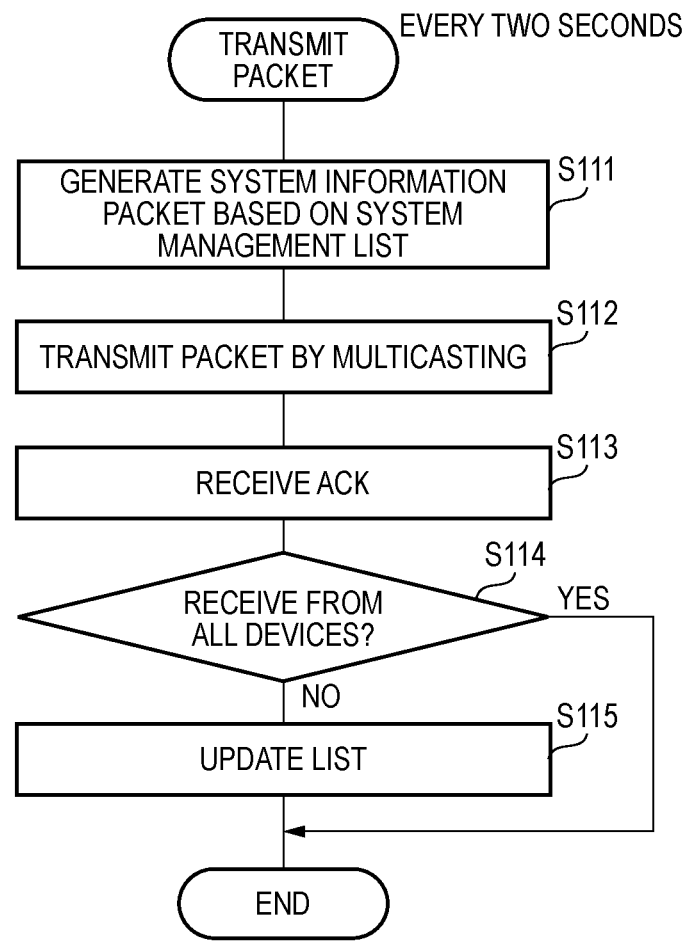
FIGS. 10A and 10B are a flow chart showing system information transmitting operation of the host device.
Figure 10B:
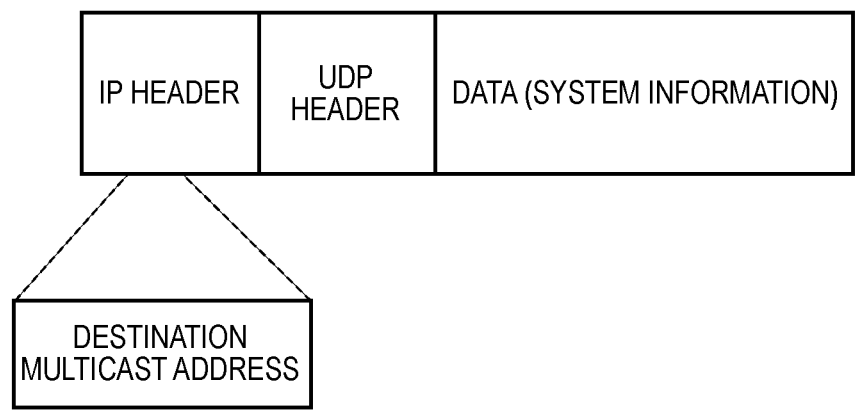

The system information packet transmission processing executed periodically will be described with reference to FIGS. 10A and 10B. In FIG. 10A, the root device 4-1 generates the system information packet based on its own system management table (S111). The system information packet has the configuration of an IP packet which contains a UDP datagram having system information shown in FIG. 10B as a data body. The multicast address set for the audio system 10 is written in a destination address of an IP header. The root device 4-1 transmits the system information packet to the multicast address given to the audio system 10. On receiving the system information packet, each of the component devices updates the system information held by itself with the system information contained in the packet, and sends, to the root device 4-1, an acknowledgement packet (ACK) indicating that the system information packet has been received. The root device 4-1 receives the acknowledgement packet from each of the component devices (S113), and determines whether responses have been sent from all the component devices or not (S114). When the responses have been sent from all the component devices (YES in S114), the root device 4-1 terminates the processing directly. When there is a component device which has not sent the response (NO in S114), the root device 4-1 rewrites the component device as inactive and updates the system management table accordingly (S115). The system management packet will be generated next time based on the contents of the updated system management table. Therefore, each of the component devices can always acquire the latest system information. Incidentally, the controller 1 is also notified of the contents of the updated management table. Incidentally, in the description of FIGS. 10A and 10B, the system information is transmitted by multicasting. However, the system information may be transmitted individually to the respective component devices by unicasting.

There may be scenes in which the component device cannot send an ACK to the root device 4-1. Some of the scenes are attributable to the component device itself. For example, the device itself is powered off (a plug of the device is pulled out of the socket). The other scenes are attributable to an upper device in the tree. For example, the upper device is powered off (a plug of the device is pulled out of the socket), or a radio wave status for communication is poor. When communication between the component device (particularly, a node device or a leaf device) and an upper component device (internal access point 4A) is disconnected from the upper component device, the component device searches for another connectable access point so as to try to establish reconnection automatically. Incidentally, the event where the communication with the upper internal access point 4A has been disconnected can be determined, for example, from a fact that the aforementioned system information packet has not been transmitted to the component device, a fact that an update notification of a cryptographic key has not been sent to the component device or there is no response to a keep-alive packet while the update notification or the response should be sent in a Wi-Fi communication maintenance procedure.

Figure 11:
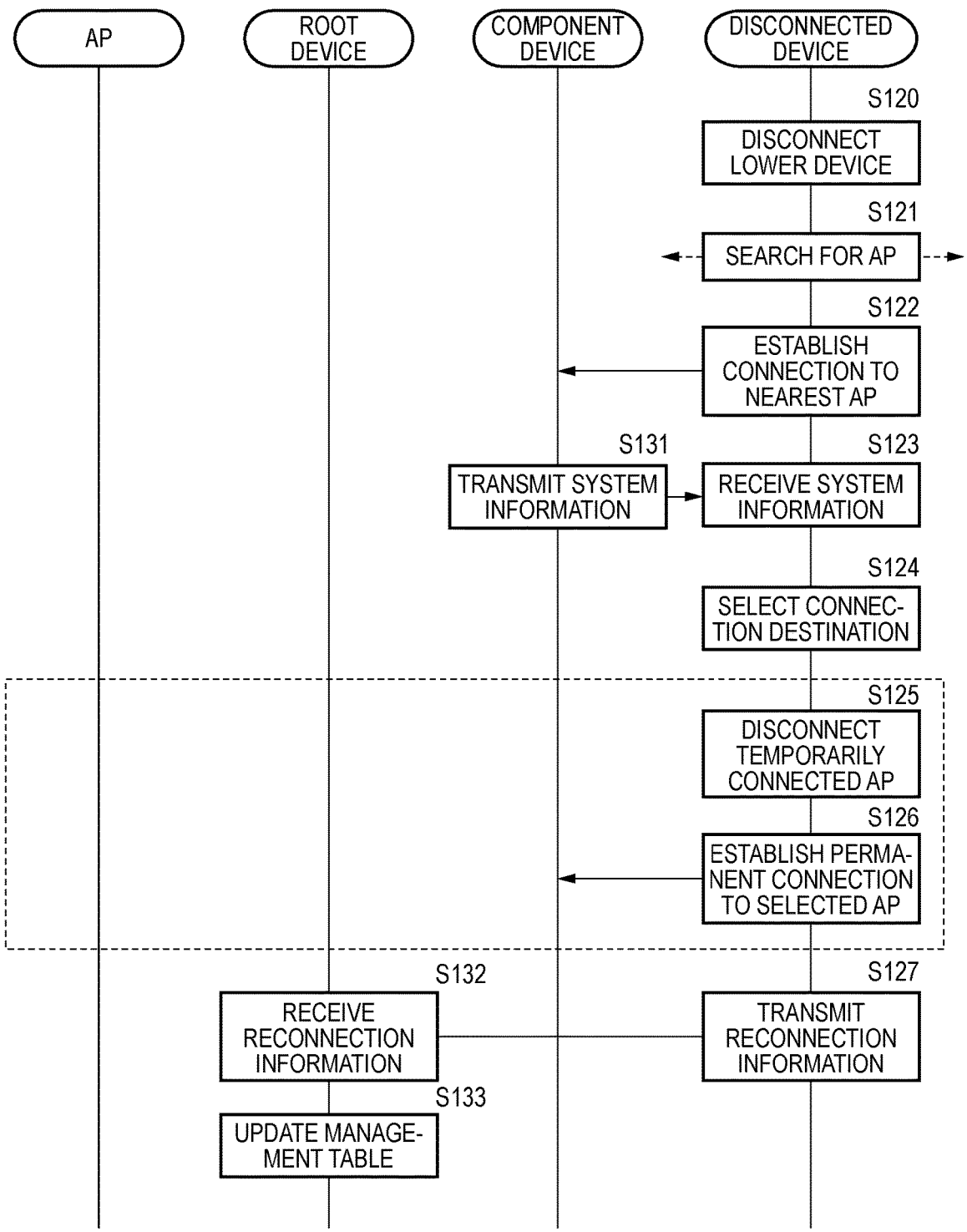
FIG. 11 is a view showing a communication procedure at the time of reconnection of an audio device.

A communication procedure at the time of reconnection will be described below with reference to FIG. 11. The component device (hereinafter referred to as disconnected device) which has been disconnected from the upper internal access point 4A stops its own internal access point 4A (S120). When the internal access point 4A is connected to a lower component device, communication of the internal access point 4A with the lower component device is disconnected and the lower component device also starts this operation.

The disconnected device searches for connectable access points (S121). The searching is performed by active scanning on the internal access points 4A described in the system information, based on the system information which is held by the disconnected device at that time. Since connection is tried based on the system information, the disconnected device can be connected to one of the internal access points 4A without cancelling the stealth mode. The disconnected device is temporarily connected to a nearest internal access point 4A found in the searching (S123). The connection is not permanent connection for returning to the audio system 10 but temporary connection for acquiring the latest system information. The latest system information of the audio system 10 is acquired from the connected internal access point 4A (component device) (S131, S123). The disconnected device selects a most suitable access point for reconnection to the audio system 10 based on the acquired system information (S124).

When another access point than the current temporarily connected internal access point 4A is selected in S124, the disconnected device disconnects the temporarily connected internal access point 4A (S125) and establishes permanent connection to the selected access point (S126). The permanently connected access point is not limited to the internal access point 4A. The connection information even about the external access point 3 is often contained in the system information. When the current temporarily connected internal access point 4A is determined as the most suitable reconnection destination, a procedure of S125 and S126 is not performed.

In S127, the disconnected device transmits, to the root device 4-1, reconnection information including information about the access point as the reconnection destination. The root device 4-1 receives the reconnection information (S132), rewrites the component device as active, and updates the system management table accordingly (S133). The updated contents will be distributed to each of the component devices at the next time of transmission of the system information packet (FIGS. 10A and 10B).

A connection destination change procedure from disconnection of communication of a component device to reconnection of the component device will be described with reference to FIGS. 12 to 15. This example shows a case in which the number of component devices in the audio system 10 is smaller by one than that in the example of FIG. 1 and one leaf device 4-7 is connected to the node device 4-3.

Figure 12:
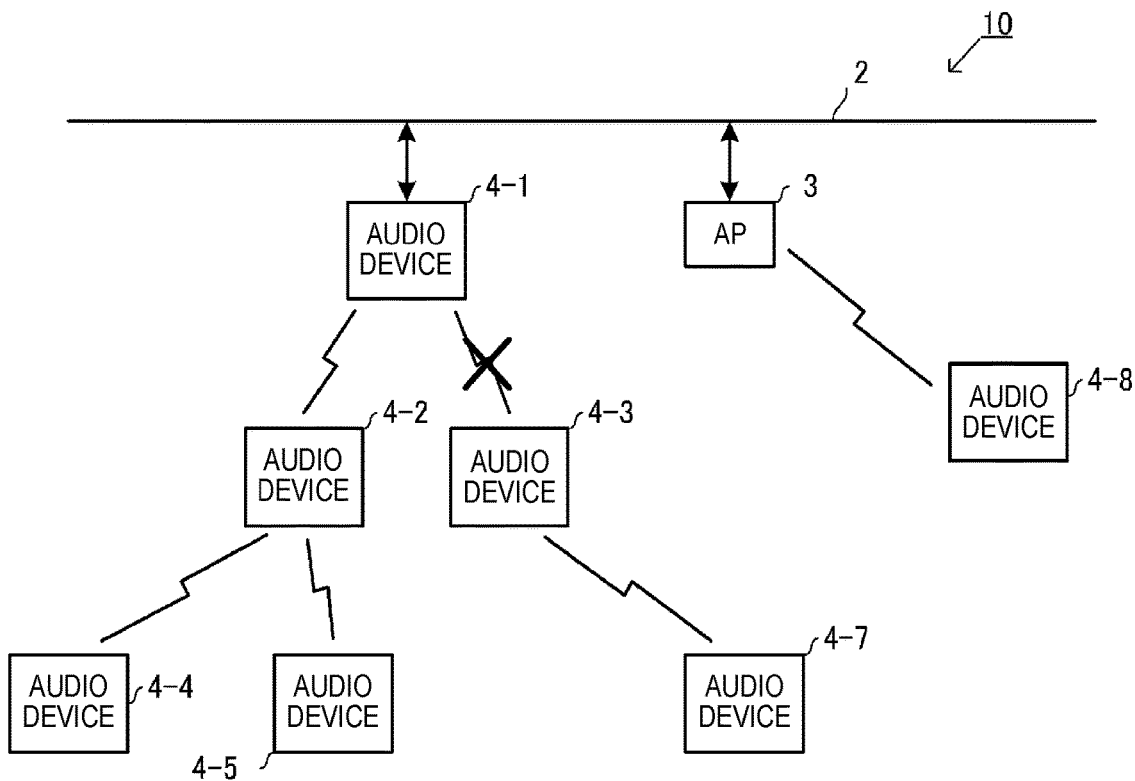
FIG. 12 is a view for explaining a connection destination change form at the time of reconnection in the audio system.

FIG. 12 shows a scene in which communication between the internal access point 4A-1 of the root device 4-1 and the node device 4-3 has been disconnected due to deterioration of the radio wave status etc. Communication between the internal access point 4A-1 of the root device 4-1 and the node device 4-2 is maintained.

Figure 13:
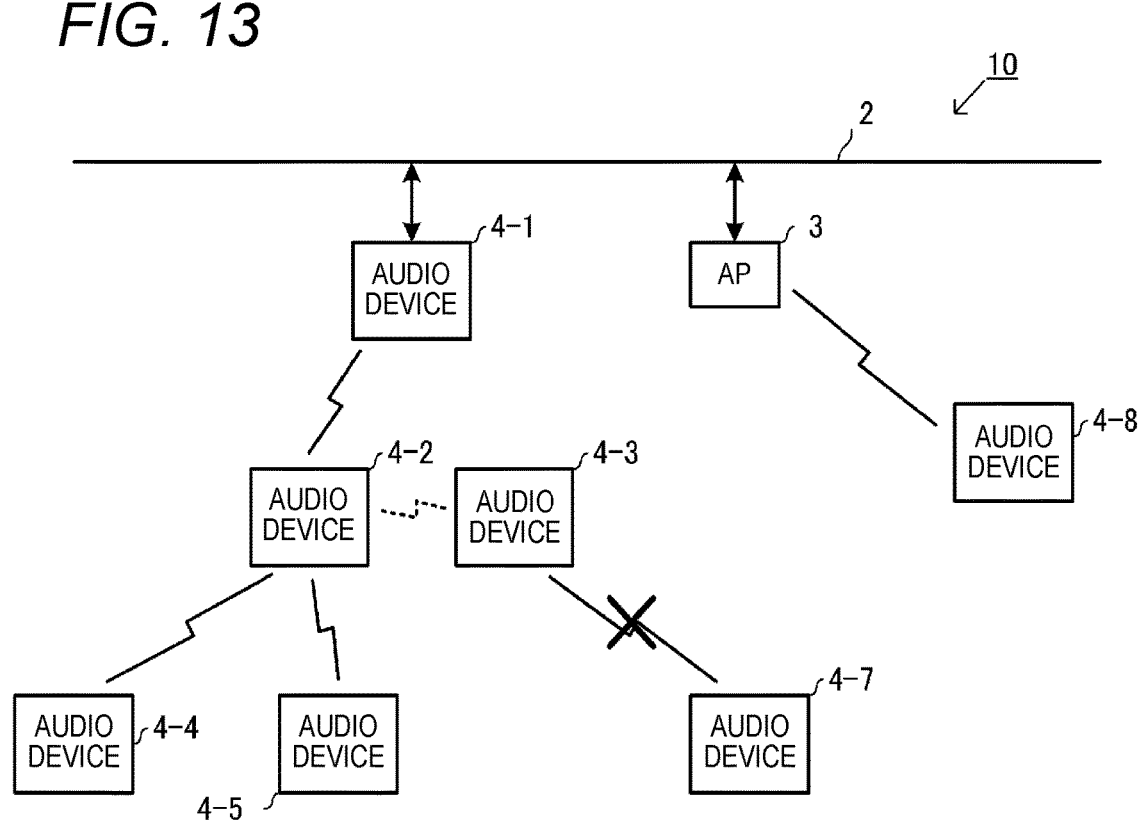
FIG. 13 is a view for explaining a connection destination change form at the time of reconnection in the audio system.
Figure 14:
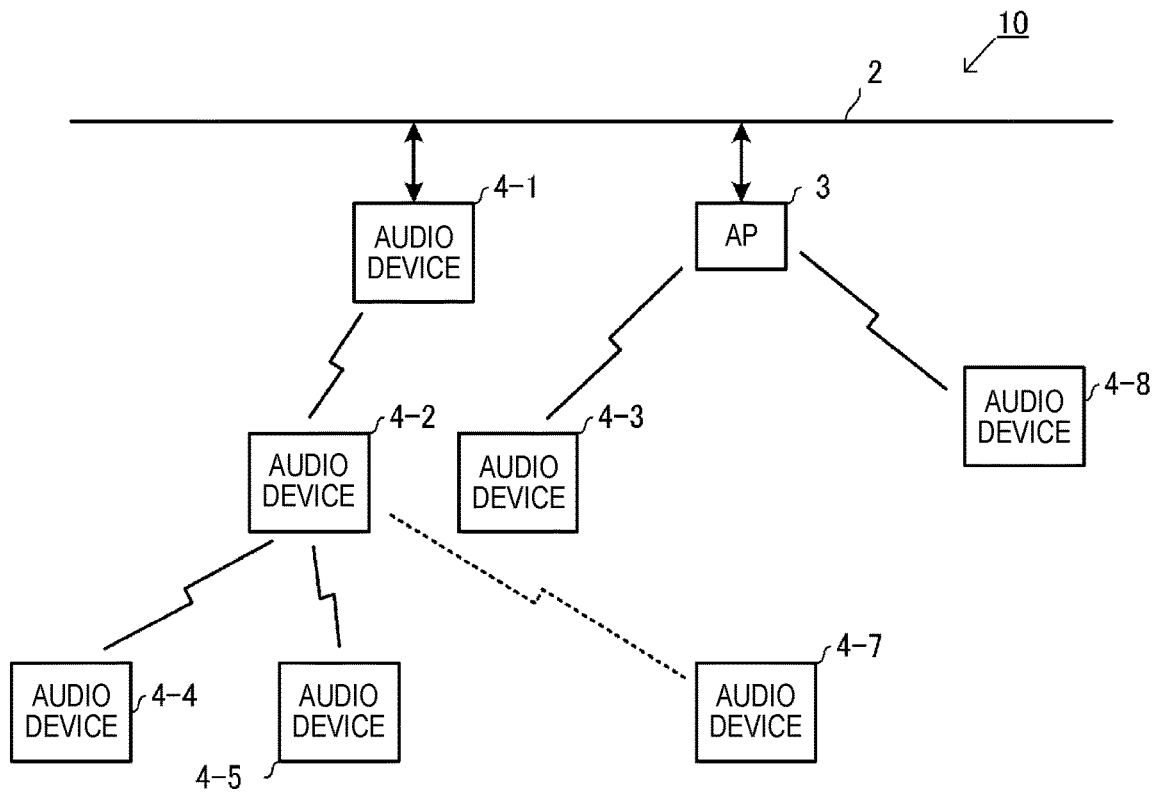
FIG. 14 is a view for explaining a connection destination change form at the time of reconnection in the audio system.

In FIG. 13, the audio device 4-3 which does not serve as a node device anymore disconnects the communication with the lower leaf device 4-7, and establishes reconnection to the nearest node device 4-2 based on the system information held by the audio device 4-3 itself at that time. The audio device 4-3 acquires latest system information from the node device 4-2. However, since two leaf devices 4-4 and 4-5 have already been connected to the node device 4-2, the audio device 4-3 cannot establish permanent connection to the node device 4-2. Therefore, the audio device 4-3 selects the external access point 3 as another connectable access point based on the system information. Consequently, the audio device 4-3 is connected to the external access point 3 to serve as a branch device, as shown in FIG. 14. When the communication with the internal access point 4A-1 of the root device 4-1 is restored here, the audio device 4-3 may establish reconnection to the root device 4-1.

Figure 15:
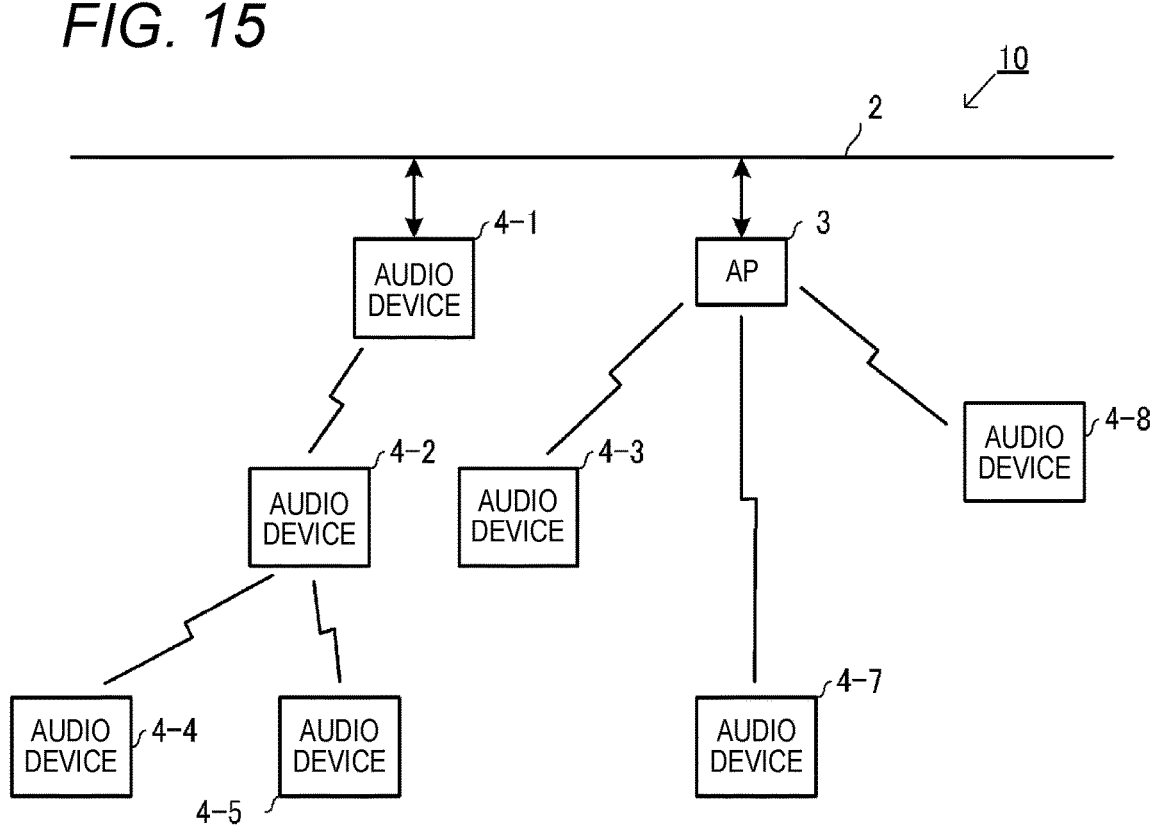
FIG. 15 is a view for explaining a connection destination change form at the time of reconnection in the audio system.

In FIG. 14, the audio device 4-7 which served as a leaf device establishes reconnection to the nearest node device 4-2 based on the system information held by the audio device 4-7 at that time. The audio device 4-7 acquires latest system information from the node device 4-2. However, since two leaf devices 4-4 and 4-5 have already been connected to the node device 4-2, the audio device 4-7 cannot establish permanent connection to the node device 4-2. Therefore, the audio device 4-7 selects the external access point 3 as another connectable access point based on the latest system information. Consequently, the audio device 4-7 establishes connection to the external access point 3 to serve as a branch device, as shown in FIG. 15.

In the embodiment, the number of hierarchical tiers in the tree is limited to three and the number of lower devices which can be connected to each audio device 4 is limited to two. Accordingly, reconnection is performed in a tree formed as shown in FIGS. 12 to 15. However, when the number of hierarchical tiers or the number of connected lower devices is made larger, reconnection may be performed in a tree having a different shape.

Incidentally, the audio device according to the disclosure may be an audio/video (AV) device having a video reproduction function, and includes a system in which such audio/video (AV) devices are mixed. In the embodiment, the control terminal device is materialized by the portable phone 1 having the audio system control program 70 (application program) installed therein. However, the control terminal device may have another configuration than that. For example, the control terminal device may be a tablet terminal having the audio system control program 70 installed therein, or may be a special purpose terminal device.

Here, the embodiment of the disclosure will be summarized as follows.

(1) The communication system according to the disclosure is a communication system including: communication devices configured to be connected to one another through a network, wherein a root device which is one of the communication devices stores system information including address information and information on availability of communication of each of the communication devices;

wherein the root device is configured to transmit the system information to each of the communication devices periodically;

wherein each of the communication devices is configured to send an acknowledgement message to the root device when receiving the system information; and wherein the root device is configured to determine whether the acknowledgement message has been sent from each of the communication devices or not, and, when an acknowledgement message from one of the communication devices has not been received by the root device, the root device is configured to rewrite the information on availability of communication of the communication device from which the acknowledgement message has not been received by the root device, as incommunicable, and to update the system information accordingly.

(2) Provided is a communication system according to the aforementioned (1), for example, wherein when receiving a reconnection message from the communication device from which the acknowledgement message has not been received by the root device, the root device is configured to rewrite the information on availability of communication of the communication device which has transmitted the reconnection message, as communicable; and wherein when a communication device is added to the communication system, the root device is configured to store system information of the added communication device.

(3) Provided is a communication system according to the aforementioned (1) or (2), for example, wherein the root device is configured to transmit the system information to the communication devices by multicasting.

(4) Provided is a communication system according to any one of the aforementioned (1) through (3), for example, wherein a communication device which has been disconnected from the network is configured to be reconnected to any one of the communication devices based on system information stored by the disconnected communication device.

(5) Provided is a communication system according to the aforementioned (4), for example, wherein the disconnected communication device is configured to acquire system information from the reconnected communication device, and to establish permanent connection to any one of the communication devices based on the acquired system information.

(6) Provided is a communication system according to any one of the aforementioned (1) through (5), for example, wherein the communication devices are audio devices.

(7) The communication device according to the disclosure is a communication device including:

a communication portion configured to communicate with another communication device;

a storage portion that stores system information including address information and information on availability of communication of the other communication device; and a control portion, wherein the control portion, by using the communication portion, is configured to:

transmit the system information to the other communication device periodically; and determine whether an acknowledgement message in response to the transmission of the system information has been received from the other communication device or not, and, when the acknowledgement message has not been received from the other communication device, rewrite the information on availability of communication of the other communication device as incommunicable, and update the system information accordingly.

(8) Provided is a communication device according to the aforementioned (7), for example, wherein when receiving a reconnection message from the other communication device from which the acknowledgement message has not been received by the communication portion, the control portion is configured to rewrite the system information of the other communication device as communicable (active).

(9) Provided is a communication device according to the aforementioned (7) or (8), for example, wherein the control portion is configured to transmit the system information to the other communication device by multicasting.

(10) Provided is a communication device according to any one of the aforementioned (7) through (9), for example, wherein the system information includes address information and information on availability of communication of a communication device other than the other communication device; and wherein when disconnected from the other communication device, the control portion is configured to establish reconnection to the communication device other than the other communication device based on the system information stored by the storage portion.

(11) Provided is a communication device according to the aforementioned (10), for example, wherein the control portion is configured to acquire system information from the reconnected communication device, and establish permanent connection to further another communication device based on the acquired system information.

(12) Provided is a communication device according to any one of the aforementioned (7) through (11), for example, wherein the communication device and the other communication device are audio devices.

(13) The management method for the communication system according to the disclosure is a management method for a communication system having communication devices which are connected to one another through a network, the management method including:

transmitting system information including address information and information on availability of communication of the communication devices to each of the communication devices periodically from a root device which is one of the communication devices;

sending from each of the communication devices an acknowledgement message to the root device when receiving the system information; and determining whether the acknowledgement message has been sent from each of the communication devices or not in the root device, and, when an acknowledgement message from one of the communication devices has not been received by the root device, rewriting the information on availability of communication of the communication device from which the acknowledgement message has not been received by the root device, as incommunicable, and updating the system information accordingly in the root device.
(14) Provided is a management method for a communication system according to the aforementioned (13), for example, wherein when receiving a reconnection message from the communication device from which the acknowledgement message has not been received by the root device, the system information of the communication device which has transmitted the reconnection message is rewritten by the root device, as communicable; and
wherein when a communication device has been added to the communication system, system information of the added communication device is stored in the root device.
(15) Provided is a management method for a communication system according to the aforementioned (13) or (14), for example, wherein the system information to the communication devices is transmitted from the root device by multicasting.
(16) Provided is a management method for a communication system according to any one of the aforementioned (13) through (15), for example, wherein a communication device which has been disconnected from the network is reconnected to any one of the communication devices based on system information stored by the disconnected communication device.
(17) Provided is a management method for a communication system according to the aforementioned (16), for example, wherein system information is acquired from the reconnected communication device by the disconnected communication device, and permanent connection of the disconnected communication device to any one of the communication devices is established based on the acquired system information.
(18) Provided is a management method for a communication system according to any one of the aforementioned (13) through (17), for example, wherein the communication devices are audio devices.

According to the disclosure, it is possible to make connection of a communication device to a network easy. Accordingly, the disclosure is useful.

The invention claimed is:
1. A communication system comprising:
communication devices configured to be connected to one another through a network,
wherein a root device which is one of the communication devices stores system information including address information and information on availability of communication of each of the communication devices;
wherein the root device is configured to transmit the system information to each of the communication devices periodically;
wherein each of the communication devices is configured to send an acknowledgement message to the root device when receiving the system information;
wherein the root device is configured to determine whether the acknowledgement message has been sent from each of the communication devices or not, and, when an acknowledgement message from one of the communication devices has not been received by the root device, the root device is configured to rewrite the information on availability of communication of the communication device from which the acknowledgement message has not been received by the root device, as incommunicable, and to update the system information accordingly; and
wherein a communication device which has been disconnected from the network is configured to be reconnected to any one of the communication devices based on system information stored by the disconnected communication device.
2. The communication system according to claim 1, wherein when receiving a reconnection message from the communication device from which the acknowledgement message has not been received by the root device, the root device is configured to rewrite the information on availability of communication of the communication device which has transmitted the reconnection message, as communicable; and
wherein when a communication device is added to the communication system, the root device is configured to store system information of the added communication device.
3. The communication system according to claim 1, wherein the root device is configured to transmit the system information to the communication devices by multicasting.
4. The communication system according to claim 1, wherein the communication devices are audio devices.
5. The communication system according to claim 1, wherein the disconnected communication device is configured to acquire system information from the reconnected communication device, and to establish permanent connection to any one of the communication devices based on the acquired system information.
6. A communication device comprising:
a communication portion configured to communicate with another communication device;
a storage portion that stores system information including address information and information on availability of communication of the other communication device; and
a control portion,
wherein the control portion, by using the communication portion, is configured to:
transmit the system information to the other communication device periodically; and
determine whether an acknowledgement message in response to the transmission of the system information has been received from the other communication device or not, and, when the acknowledgement message has not been received from the other communication device, rewrite the information on availability of communication of the other communication device as incommunicable, and update the system information accordingly;
wherein the system information includes address information and information on availability of communication of a communication device other than the other communication device; and
wherein when disconnected from the other communication device, the control portion is configured to establish reconnection to the communication device other than the other communication device based on the system information stored by the storage portion.
7. The communication device according to claim 6, wherein the communication device and the other communication device are audio devices.
8. The communication device according to claim 6, wherein when receiving a reconnection message from the other communication device from which the acknowledge- ment message has not been received by the communication portion, the control portion is configured to rewrite the system information of the other communication device as communicable.

9. The communication device according to claim 6, wherein the control portion is configured to transmit the system information to the other communication device by multicasting.

10. The communication device according to claim 6, wherein the control portion is configured to acquire system information from the reconnected communication device, and establish permanent connection to further another communication device based on the acquired system information.

11. A management method for a communication system having communication devices which are connected to one another through a network, the management method comprising:
    transmitting system information including address information and information on availability of communication of the communication devices to each of the communication devices periodically from a root device which is one of the communication devices;
    sending from each of the communication devices an acknowledgement message to the root device when receiving the system information; and
    determining whether the acknowledgement message has been sent from each of the communication devices or not in the root device, and, when an acknowledgement message from one of the communication devices has not been received by the root device, rewriting the information on availability of communication of the communication device from which the acknowledgement message has not been received by the root device, as incommunicable, and updating the system information accordingly in the root device;
    wherein a communication device which has been disconnected from the network is reconnected to any one of the communication devices based on system information stored by the disconnected communication device.

12. The management method for a communication system according to claim 11, wherein the communication devices are audio devices.

13. The management method for a communication system according to claim 11, wherein system information is acquired from the reconnected communication device by the disconnected communication device, and permanent connection of the disconnected communication device to any one of the communication devices is established based on the acquired system information.

14. The management method for a communication system according to claim 11, wherein when receiving a reconnection message from the communication device from which the acknowledgement message has not been received by the root device, the system information of the communication device which has transmitted the reconnection message is rewritten by the root device, as communicable; and
    wherein when a communication device has been added to the communication system, system information of the added communication device is stored in the root device.

15. The management method for a communication system according to claim 11, wherein the system information to the communication devices is transmitted from the root device by multicasting.

* * * * *